United States Patent [19]

Jagielinski

[11] Patent Number: 5,216,561
[45] Date of Patent: Jun. 1, 1993

[54] APPARATUS AND METHOD OF MANIPULATING SUM, ABSOLUTE DIFFERENCE AND DIFFERENCE SIGNALS FOR SUPPRESSING MEDIUM-INDUCED PLAYBACK ERROR IN A MAGNETORESISTIVE HEAD ASSEMBLY

[75] Inventor: Tomasz M. Jagielinski, Carlsbad, Calif.

[73] Assignee: Eastman Kodak Company, Rochester, N.Y.

[21] Appl. No.: 751,842

[22] Filed: Aug. 29, 1991

[51] Int. Cl.⁵ ............................................. G11B 5/127
[52] U.S. Cl. .................................................. 360/113
[58] Field of Search ........................................ 360/113

[56] References Cited

U.S. PATENT DOCUMENTS 5,079,663 1/1992 Ju ....................................... 360/113

Primary Examiner—A. J. Heinz
Attorney, Agent, or Firm—William W. Holloway

[57] ABSTRACT

A magnetoresistive (MR) head assembly includes an elongated MR element, arranged transverse to an adjacent magnetic recording medium, defining two substantially equal MR portions. Signal processing circuitry, coupled to respective outputs of the two MR portions, is arranged for producing and manipulating sum and difference signals of respective playback signals developed across the two MR portions, to produce a resultant information-bearing signal played back from both MR portions that is unperturbed by any error signal induced by a localized asperity in the adjacent magnetic recording medium.

5 Claims, 2 Drawing Sheets

APPARATUS AND METHOD OF MANIPULATING SUM, ABSOLUTE DIFFERENCE AND DIFFERENCE SIGNALS FOR SUPPRESSING MEDIUM-INDUCED PLAYBACK ERROR IN A MAGNETORESISTIVE HEAD ASSEMBLY

CROSS-REFERENCE TO A RELATED APPLICATION

Reference is hereby made to U.S. Pat. No. 5,084,794 in the name of N. Smith and entitled SHORTED DUAL ELEMENT MAGNETORESISTIVE REPRODUCE HEAD EXHIBITING HIGH DENSITY SIGNAL AMPLIFICATION.

BACKGROUND OF THE INVENTION

1. Field Of The Invention

This invention relates to a magnetoresistive head assembly. More particularly, the invention relates to apparatus and a method for suppressing head-assembly playback signal error induced by an asperity in a magnetic recording medium.

2. Description Relative to the Prior Art

Magnetoresistive (MR) reproduce heads have gained wide acceptance in the magnetic recording field since they were disclosed in U.S. Pat. No. 3,493,694, issued to Hunt in 1970. An MR head is characterized by high output and low noise, making it particularly attractive for reproducing short wavelength signals. It may be fabricated by thin film deposition techniques allowing the relatively inexpensive manufacture of multitrack heads with narrow track widths for high density applications.

As taught in the patent to Hunt, the resistivity, $\rho$, of an elongated MR element can be expressed as:

$$\rho = \rho_o + \Delta\rho \cos^2 \theta, \text{ where}$$

$\rho_o$ is the isotropic resistivity of the bulk material, $\Delta\rho$ is the magnetoresistive coefficient (approximately 0.02 for Permalloy), and $\theta$ is the angle between the magnetization, M, of the MR element and measuring current, I, flowing through the element.

Since the magnetoresistive effect obeys a square law, it is desirable to establish an equilibrium angle between M and I of approximately 45° to obtain essentially a linear mode of operation. Commonly, an anisotropy is established whose easy axis coincides with the longitudinal axis of the MR element and an external magnetic bias field is used that is transverse to the easy axis. The magnetic field source can be, for example, a thin film magnetic head or, as is also taught by Hunt, a permanent magnet, an electromagnet, a solenoid, etc.

Thermal fluctuations can produce a resistance change in an MR element. A thermally induced resistance change is an effect which, if it falls in the proper frequency range, can be interpreted erroneously as a signal produced by magnetic flux.

It is known in the art to compensate for ambient temperature changes by employing two MR elements interconnected to a differential amplifier to provide so-called common mode rejection of thermal effects. With both MR elements susceptible to the same ambient conditions, any thermally induced ambient effect in an MR element arranged for sensing magnetic flux transitions can be removed by subtracting from its output the output of a second MR element arranged to respond to temperature change but not to flux transitions. For more on this, see U.S. Pat. Nos. 3,860,965 and 3,979,775.

Although common-mode rejection techniques can compensate for low-frequency ambient temperature changes in an operating environment, a magnetic recording medium itself can be a major source of thermally induced resistance change in an MR element. With a magnetic tape or disk, for example, any slight imperfection or localized asperity in the oxide coating on the recording medium can cause "hot spots". Dust, lint, and other minute foreign matter on a magnetic recording surface may also cause hot spots. Prior art techniques intended to compensate for ambient temperature changes in the operating environment are not capable of compensating for localized media-induced effects. This is primarily for the reason that common-mode-rejection operates on the basis that two or more MR elements experience the same thermal effects simultaneously whereas localized asperities in a recording medium are normally so small that they would not be sensed by more than one MR element at any one time.

U.S. Pat. No. 4,040,113, on the other hand, discloses a magnetoresistive head assembly that is intended to compensate for temperature fluctuations due to variations in the roughness of the magnetic recording medium. For that purpose, the head assembly has a center-tapped electrical connection for dividing the MR element into two equal portions. As with other arrangements operated in a common rejection mode, however, U.S. Pat. No. 4,040,113 teaches that thermally induced fluctuations must be the same in each half of the head assembly in order to suppress adverse media effects. In other words, the common mode rejection of the '113 patent would not be effective in suppressing the effects of localized media asperities, i.e., asperities of small size. Notwithstanding this disadvantage, the magnetoresistive head assembly of U.S. Pat. No. 4,040,113 suffers from a further disadvantage in that the equilibrium angle between the easy axis of magnetization and the direction of current flow is achieved by providing a "barber-pole" pattern of highly conductive equipotential strips on the MR element. This pattern, which forces current to flow at a desired equilibrium angle with respect to the easy axis of the MR element, prevents the MR element from sensing magnetic flux wherever the conductive strips are located. In other words, the sensitivity of the head assembly is diminished in proportion to the surface area of the MR element that is covered by the "barber-pole" pattern of current-forcing strips.

SUMMARY OF THE INVENTION

In view of the foregoing, an object of the invention is to provide a magnetoresistive (MR) head assembly which eliminates from a playback signal the effects of localized asperities in a magnetic recording medium, without suffering a reduction in playback sensitivity.

The object of the invention, insofar as suppressing the effects of localized asperities in a recording medium, is achieved by means of an MR head assembly including an elongated MR element having first and second electrical conductors connected, respectively, to opposing ends thereof, and a third electrical conductor connected at the mid-point thereof, for cooperatively dividing said element into two substantially equal magnetoresistive portions. Signal processing circuitry, coupled to the three conductors, includes a summing circuit for producing a first control signal corresponding to the sum of respective playback signals developed across the two MR portions, and a first differential circuit for producing a second control signal corresponding to the absolute value of the difference between the playback signal developed across one of the MR portions and the playback signal across the other MR portion. When a localized media asperity of small size has been sensed, the second control signal represents an error signal induced by such an asperity whereas the first control signal represents a resultant signal corresponding to the error signal and the sum of recorded information sensed by both portions of the MR element. A second differential circuit, coupled to the respective outputs of the summing circuit and the first differential circuit, serves for producing a third control signal corresponding to the difference between the first control signal (information plus error) and the second control signal (error only), such difference being, of course, the recorded information only. In other words, the third control signal corresponds to a resultant playback signal developed across both MR portions, i.e., the entire MR element, unperturbed by any error signal induced by a localized asperity in the adjacent magnetic recording medium.

In a presently preferred embodiment, the MR head is a so-called shorted dual element MR reproduce head as disclosed in the aforecited U.S. patent application Ser. No. 500,978. Alternatively, the MR head assembly can be comprised of two contiguous MR elements arranged side-by-side across a record track of the magnetic medium.

The advantage of an MR head assembly that eliminates the effects of localized recording media asperities, as well as other advantages of the invention, will become more apparent in the detailed description of preferred embodiments presented below.

BRIEF DESCRIPTION OF THE DRAWINGS

The invention will be described with reference to the accompanying drawings, wherein.

DETAILED DESCRIPTION OF A PREFERRED EMBODIMENT

Figure 1:
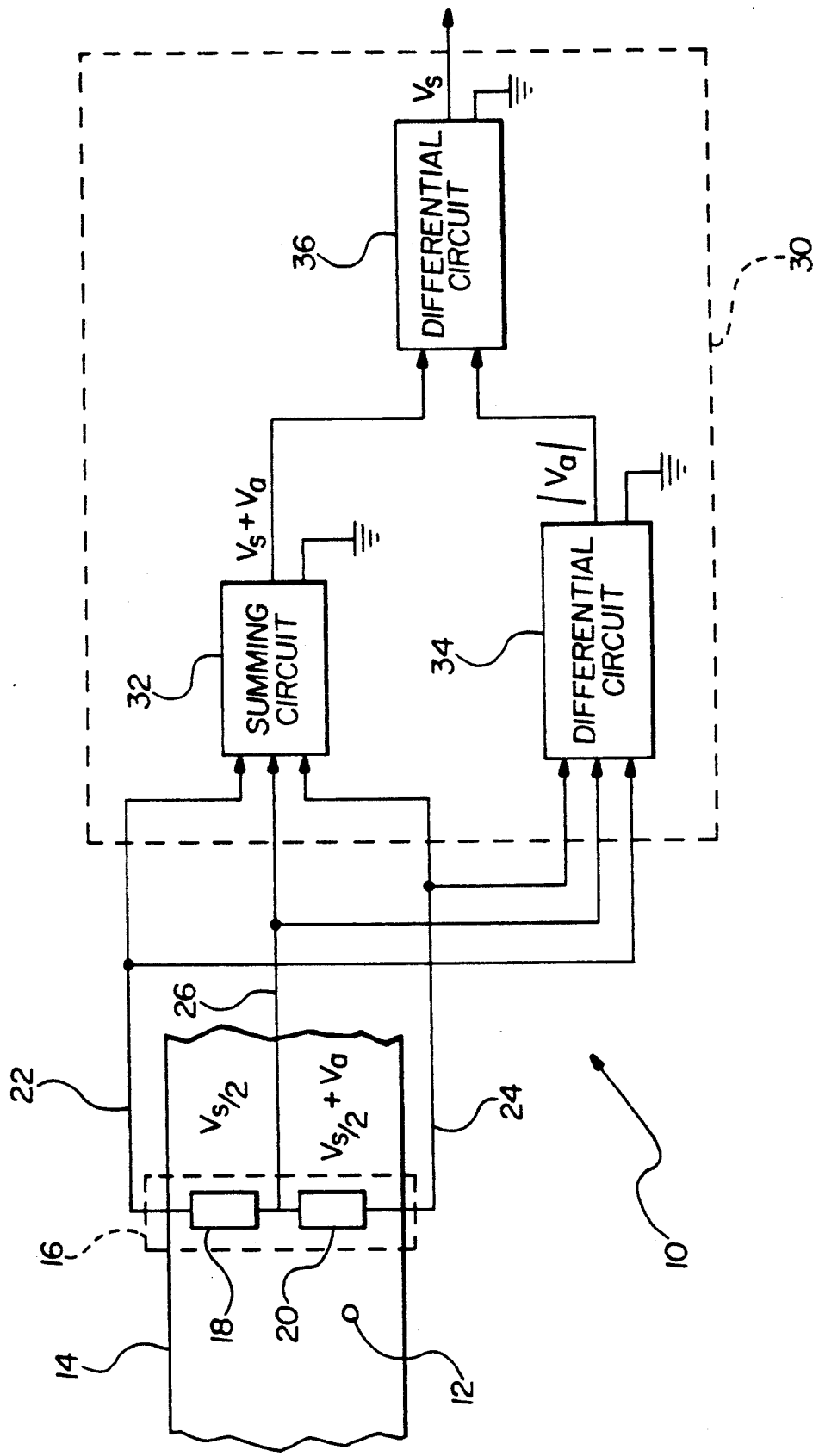
FIG. 1 is a schematic of a magnetoresistive (MR) head assembly in accordance with the present invention.

FIG. 1 shows a magnetoresistive (MR) head assembly 10, in accordance with the invention, in simplified schematic form. To eliminate or suppress the effects of a localized asperity, denoted 12, in or on an adjacent magnetic recording medium 14, the invention requires that the head assembly 10 be composed of an elongated MR element 16, arranged transverse to a given record track of the magnetic medium, containing two distinct substantially equal portions 18, 20 arranged end to end. For that purpose, the MR element 16 can be composed of a single integrated MR structure, as described in detail hereinbelow, having a pair of electrical current-carrying conductors 22, 24 connected, respectively, to opposing ends thereof, and a third current-carrying conductor 26 connected at the mid-point of the MR structure. Alternatively, the MR element 16 can be composed of two separate elements arranged end to end having their immediately adjacent ends connected electrically at a common node to the central current-carrying conductor 26. From an equivalent electrical circuit standpoint, MR element 16 can be represented by two parallelly connected resistors of equal value.

In the absence of any media asperity, an information-bearing signal measured by each of the MR portions 18, 20 is half of the total voltage signal, $V_s$, measured across the entire MR element 16. In other words, each MR portion 18, 20 provides an information-bearing output signal of magnitude $V_s/2$. In a digital recording system, for example, the voltage signal $V_s$ could have a magnitude of zero for one binary state and a non-zero magnitude for a second binary state.

A localized asperity in or on the recording medium creates friction, thereby momentarily raising the temperature of the MR playback head. This frictional heating increases head resistivity, thereby producing a positive-going voltage spike. When both a localized asperity and recorded information are sensed, a total voltage signal is produced across the MR element 16 of magnitude $V_s + V_a$, where $V_a$ is an error signal induced by the localized asperity.

A localized asperity, because of its small size, is normally sensed by only one of the two MR portions, unless the asperity is located precisely at the center of a record track. In other words, the MR portion 20 sensing the asperity 12, as shown in FIG. 1, has an output of $V_s/2 + V_a$ whereas the other MR portion 18 has an output of $V_s/2$.

The invention further requires signal processing circuitry 30 coupled to the output of the MR element 16, for suppressing the effects of the localized asperity 12. In other words, the signal processing circuitry 30 serves to eliminate the error signal $V_a$ from the total output signal.

In a presently preferred embodiment, the circuitry 30 includes a summing circuit 32, coupled to the three electrical conductors 22, 24, 26, arranged for producing a first control signal equal to the sum of the voltage signals dropped across the MR portion 18 and the MR portion 20. Assuming an asperity has been sensed along with recorded information, the first control signal is of the form:

$$V_s/2 + V_s/2 + V_a = V_s + V_a.$$

The signal processing circuitry 30 also includes a first differential circuit 34, coupled to the electrical conductors 22, 24, 26, arranged for producing a second control signal having a magnitude equal to the absolute value of the difference between the respective outputs across the MR portions 18, 20. In arithmetic form, the differential circuit 34 performs the following operation:

$$|V_s/2 - (V_s/2 + V_a)| = |-V_a| = V_a$$

The signal processing circuitry 30 further includes a second differential circuit 36, coupled to the respective outputs of the summing circuit 32 and the first differential circuit 34, arranged for producing an output control signal equal to the difference between the respective signals provided by the summing circuit 32 and the differential circuit 34. In arithmetic form, the second differential circuit performs the following operation:

$$V_s + V_a(\text{circuit 32}) - V_a(\text{circuit 34}) = V_s.$$

In other words, the second differential circuit 36 produces an output signal corresponding to a resultant information-bearing signal developed across both MR portions 18, 20 (the total MR element 16) that is unperturbed by the error signal induced by the asperity 12 in the magnetic recording medium 14.

Figure 2:
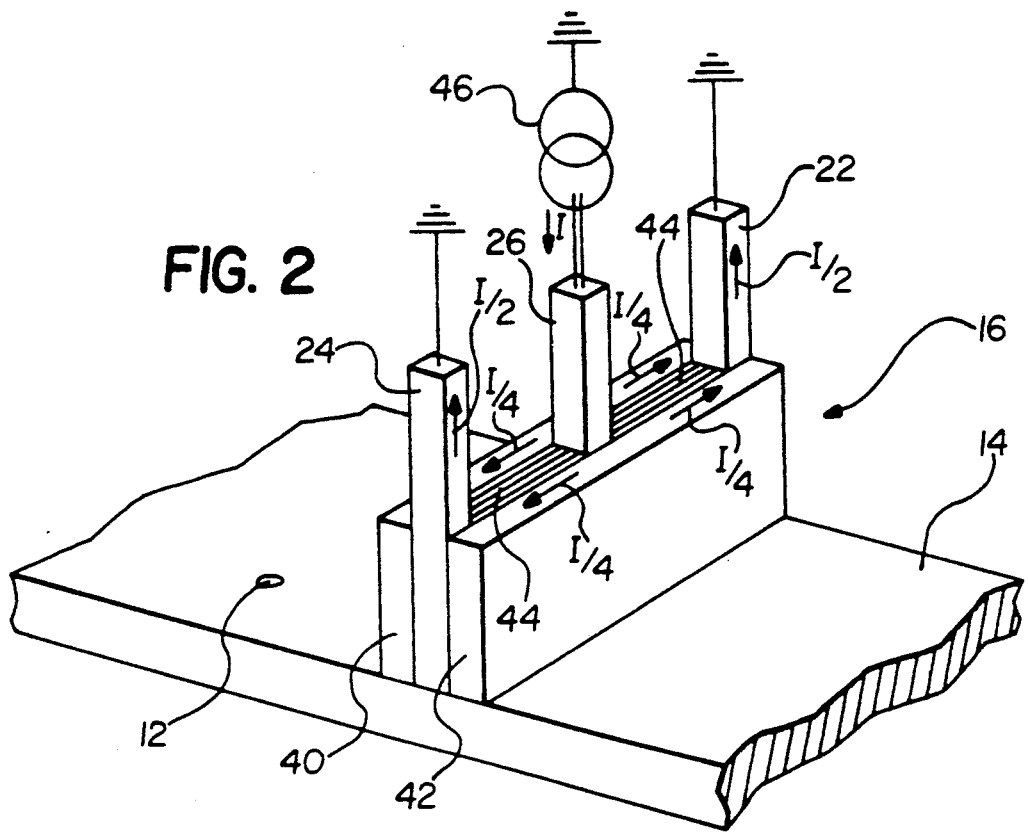
FIG. 2 is a perspective view of a presently preferred embodiment of a dual MR element playback head.

FIG. 2 shows a presently preferred embodiment of the head assembly 10 in accordance with the invention. The assembly 10 is composed of two magnetically, electrically and geometrically matched elongated MR elements 40, 42 separated by a non-conductive spacer 44. For maximum playback sensitivity, the spacer 44 separates the MR elements 40, 42 by a distance equal to half the wavelength of information recorded on the magnetic medium 14.

As shown, the MR elements 40, 42 are connected together electrically at opposing ends by the aforementioned current-carrying conductors 22, 24, and at their corresponding mid-point by the conductor 26, for the purpose of dividing each MR element into two substantially equal MR portions. A current source 46, serially connected to the central current-carrying conductor 26, serves for supplying a fixed current, I, thereto. Because the conductor 26 divides the two identified MR elements 40, 42 substantially equally, the current I splits into two equal portions, I/2, which flow through the respective current-carrying conductors 22, 24. While flowing respectively from the central conductor 26 to the corresponding end conductor, each half current I/2 is further split into two quarter currents, I/4.

Figure 3:
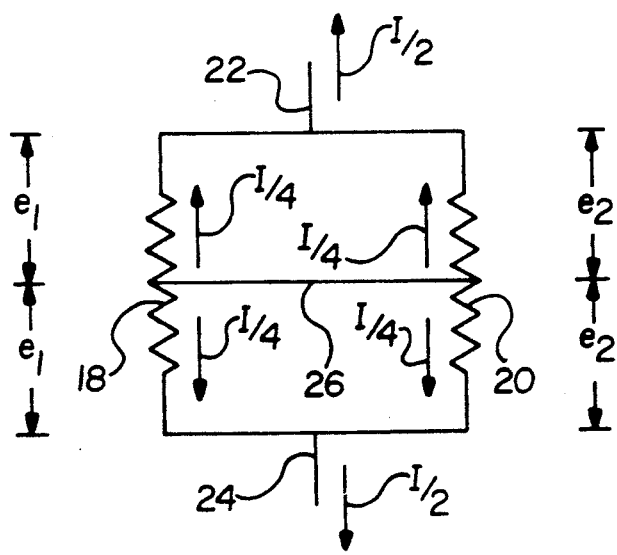
FIG. 3 is a schematic of an equivalent circuit of the dual element head of FIG. 2.

FIG. 3 shows the equivalent electrical circuit of the head assembly 10, with the total input current I split into four equal quarter currents I/4. Each quarter current I/4 serves to provide a current for sensing voltage variations across the respective half portions of the head assembly 10 as a function of information recorded on the magnetic tape 14. Because the matched MR elements 40, 42 are divided equally, the respective voltages $e_1$, $e_2$ across corresponding half portions of each MR element are, of course, substantially equal under identical operating conditions.

In addition to a sensing function, each quarter current I/4 also serves for generating a magnetic field that results in a mutual bias for establishing the appropriate equalization angle between the magnetization of the adjacent MR element and the sensing current. To that end, the anisotropy of each MR element 40, 42 has an easy axis in the plane of the respective MR element coincident with the longitudinal axis thereof. Patentable features of a dual element MR head of the type shown in FIG. 2 are disclosed and claimed in the aforecited U.S. patent application Ser. No. 500,978, the disclosure of which is incorporated herein by reference.

The invention has been described in detail with reference to the figures; however, it will be appreciated that variations and modifications are possible within the spirit and scope of the invention.

What is claimed is:

1. A magnetoresistive head assembly for suppressing an output error signal induced by a localized asperity in an adjacent magnetic medium, said head assembly comprising:

a) magnetoresistive means cooperatively defining at least two magnetoresistive portions arranged in tandum transverse to an adjacent magnetic recording medium;

b) means for producing a sum signal from respective playback signals developed across said magnetoresistive portions;

c) means for producing an absolute value signal of the difference between said respective playback signals;

d) means for combining said sum and said absolute value signals to produce combination signals; and e) signal processing means arranged for manipulating said sum, absolute value, and combination signals in order to produce a resultant information-bearing signal played back from said magnetoresistive portions that is unperturbed by any error signal induced by a localized asperity in the adjacent magnetic recording medium.

2. A magnetoresistive head assembly for suppressing an error signal induced in the output of an elongated magnetoresistive element in response to a localized asperity in an adjacent magnetic medium, said head assembly comprising:

a) first and second electrical conductors connected, respectively, to opposing ends of said elongated magnetoresistive element and a third electrical conductor connected at the midpoint of said magnetoresistive element for cooperatively dividing said element into two substantially equal magnetoresistive portions;

b) means for producing a sum signal from respective playback signals developed across said magnetoresistive portions;

c) means for producing an absolute value signal of the difference between said respective playback signals;

d) means for combining said sum and said absolute value signals to produce combination signals and e) signal processing circuitry, coupled to said first, second, and third electrical conductors, arranged for manipulating said sum, absolute value and combination signals in order to produce a resultant information-bearing signal played back from said two magnetoresistive portions that is unperturbed by any error signal induced by a localized asperity in the adjacent magnetic recording medium.

3. A magnetoresistive head assembly for suppressing an error signal induced in the output of an elongated magnetoresistive element in response to a localized asperity in an adjacent magnetic medium, said head assembly comprising:

a) first and second electrical conductors connected, respectively, to opposing ends of said elongated magnetoresistive element and a third electrical conductor connected at the mid-point of said magnetoresistive element for cooperatively dividing said element into two substantially equal magnetoresistive portions;

b) a summing circuit, coupled to said first, second, and third electrical conductors, for producing a first control signal corresponding to the sum of respective playback signals developed across said two magnetoresistive portions;

c) a first differential circuit, coupled to said first, second and third electrical conductors, for producing a second control signal corresponding to the absolute value of the difference between the playback signal developed across one of said magnetoresistive portions and the playback signal developed across the other of said magnetoresistive portions; and d) a second differential circuit, coupled to said summing circuit and to said first differential circuit, for producing a third control signal corresponding to the difference between the first control signal and the second control signal, the third control signal corresponding to a resultant playback signal developed across both of said magnetoresistive portions unperturbed by any error signal induced by an asperity in the adjacent magnetic recording medium.

4. A method for suppressing a playback signal error induced by an asperity in an adjacent magnetic recording medium, said method comprising:
   a) producing first and second playback signals corresponding, respectively, to information played back from at least two magnetoresistive portions arranged transverse to an adjacent magnetic recording medium;
   b) producing a sum signal from respective playback signals developed across said magnetoresistive portions;
   c) producing an absolute value signal of the difference between said respective playback signals;
   d) combining said sum and said absolute value signals to produce combination signals; and
   e) manipulating said sum, absolute value, and combination signals in order to produce a resultant information-bearing signal played back from said two magnetoresistive portions that is unperturbed by an error signal induced by a localized asperity in the adjacent recording medium.

5. A method for suppressing error in a signal induced by an asperity in a magnetic recording medium, said method comprising:
   a) producing first and second playback signals corresponding, respectively, to information played back from a magnetic recording medium adjacent two complementary half-portions of an elongated magnetoresistive element;
   b) summing the first and second playback signals to produce a first control signal;
   c) subtracting one of the playback signals from the other playback signal to produce a second control signal; and
   d) producing a third control signal from the difference between the first control signal and the absolute value of the second control signal, the third control signal corresponding to a resultant playback signal played back from both of said complementary half-portions of said elongated magnetoresistive element that is unperturbed by any error signal induced by an asperity in the adjacent magnetic recording medium.

* * * * *